United States Patent
Chaney, Jr. et al.

(10) Patent No.: US 10,360,458 B2
(45) Date of Patent: Jul. 23, 2019

(54) METHOD OF CALCULATING DIMENSIONS OF A TOWED VEHICLE

(71) Applicant: GM GLOBAL TECHNOLOGY OPERATIONS LLC, Detroit, MI (US)

(72) Inventors: Michael T. Chaney, Jr., Royal Oak, MI (US); Mohannad Murad, Troy, MI (US); James N. Nickolaou, Clarkston, MI (US); Robert D. Sims, III, Milford, MI (US)

(73) Assignee: GM Global Technology Operations LLC, Detroit, MI (US)

(*) Notice: Subject to any disclaimer, the term of this patent is extended or adjusted under 35 U.S.C. 154(b) by 25 days.

(21) Appl. No.: 15/097,407

(22) Filed: Apr. 13, 2016

(65) Prior Publication Data
US 2017/0300761 A1    Oct. 19, 2017

(51) Int. Cl.
*G06K 9/00* (2006.01)
*B60R 1/00* (2006.01)
*G06K 9/32* (2006.01)
*G06T 7/62* (2017.01)

(52) U.S. Cl.
CPC ............ *G06K 9/00791* (2013.01); *B60R 1/00* (2013.01); *G06K 9/3258* (2013.01); *G06T 7/62* (2017.01); *B60R 2300/806* (2013.01); *B60R 2300/808* (2013.01); *G06T 2200/04* (2013.01); *G06T 2207/10012* (2013.01); *G06T 2207/30252* (2013.01)

(58) Field of Classification Search
CPC ........ B60K 9/00791; B62D 15/02; B60R 1/00
See application file for complete search history.

(56) References Cited

U.S. PATENT DOCUMENTS

| | | | | |
|---|---|---|---|---|
| 9,102,272 | B2* | 8/2015 | Trombley | ............... B60R 1/00 |
| 9,290,202 | B2* | 3/2016 | Lavoie | ............... B60W 30/00 |
| 9,290,204 | B2* | 3/2016 | Lavoie | ............... B62D 13/06 |
| 9,335,163 | B2* | 5/2016 | Lavoie | ............... G01B 21/06 |
| 9,374,562 | B2* | 6/2016 | Trombley | ............... B60R 1/003 |
| 9,403,413 | B2* | 8/2016 | Talty | ............... B60D 1/36 |
| 9,477,894 | B1* | 10/2016 | Reed | ............... G06K 9/00791 |
| 9,566,911 | B2* | 2/2017 | Greenwood | ............... B60R 1/00 |
| 2002/0109703 | A1* | 8/2002 | Okamura | ............... G06T 17/005 |
| | | | | 345/619 |
| 2014/0218533 | A1* | 8/2014 | Nerayoff | ............... H04N 7/181 |
| | | | | 348/148 |
| 2014/0249723 | A1* | 9/2014 | Pilutti | ............... B62D 15/027 |
| | | | | 701/42 |
| 2014/0297129 | A1* | 10/2014 | Lavoie | ............... B62D 13/06 |
| | | | | 701/41 |
| 2014/0303849 | A1* | 10/2014 | Hafner | ............... B62D 13/06 |
| | | | | 701/42 |

(Continued)

*Primary Examiner* — Alex C Dunn
(74) *Attorney, Agent, or Firm* — Quinn IP Law

(57) ABSTRACT

A method of calculating at least one dimension of a towed vehicle includes sensing an image of the towed vehicle with an image sensing device. A feature on the towed vehicle in the sensed image of the towed vehicle is identified with a controller using a dimension determination algorithm. The dimension of the towed vehicle is determined from the identified feature of the towed vehicle, with the controller using the dimension determination algorithm. The dimension of the towed vehicle may be input into a vehicle tow controller, to enable the vehicle tow controller to control the tow vehicle.

14 Claims, 3 Drawing Sheets

(56) References Cited

U.S. PATENT DOCUMENTS

| | | | |
|---|---|---|---|
| 2015/0115571 A1* | 4/2015 | Zhang | B60D 1/06 280/477 |
| 2015/0251697 A1* | 9/2015 | Lavoie | B62D 13/06 701/523 |
| 2016/0052548 A1* | 2/2016 | Singh | B60D 1/36 701/37 |
| 2016/0129939 A1* | 5/2016 | Singh | B62D 13/06 701/41 |

* cited by examiner

METHOD OF CALCULATING DIMENSIONS OF A TOWED VEHICLE

TECHNICAL FIELD

The disclosure generally relates to a method of calculating dimensions of a towed vehicle, and controlling a tow vehicle using the calculated dimensions of the towed vehicle.

BACKGROUND

Some vehicles are equipped with various driving assist features that assist a driver or autonomously execute different driving functions related to towed vehicles. For example, the driving assist features may include, but are not limited to, control of a tow vehicle for backing up the towed vehicle, parking assistance for parking the towed vehicle, active handling control of the tow vehicle to prevent sway of the towed vehicle, etc. Many of these driving assist features of the tow vehicle require that various dimensions of the towed vehicle be input into a vehicle tow controller of the tow vehicle. The various dimensions of the towed vehicle may include, but are not limited to, an overall length of the towed vehicle, a tire tracking width of the towed vehicle, a distance between a hitch on the tow vehicle to the wheels of the towed vehicle, etc.

SUMMARY

A method of calculating at least one dimension of a towed vehicle is provided. The method includes sensing an image of the towed vehicle with an image sensing device. A feature on the towed vehicle in the sensed image of the towed vehicle is identified with a controller using a dimension determination algorithm. The at least one dimension of the towed vehicle is determined from the identified feature of the towed vehicle, with the controller using the dimension determination algorithm.

A method of controlling a tow vehicle having a towed vehicle connected thereto is also provided. The method includes sensing an image of the towed vehicle with an image sensing device, and determining at least one dimension of the towed vehicle, with a controller using a dimension determination algorithm, from a feature of the towed vehicle that is identified from the sensed image of the towed vehicle. The at least one dimension of the towed vehicle is uploaded into a vehicle tow controller of the tow vehicle. The vehicle tow controller then controls the tow vehicle based on the at least one dimension of the towed vehicle.

Accordingly, the controller, using the dimension determination algorithm, calculates at least one dimension of the towed vehicle, which may be used by the vehicle tow controller to control the tow vehicle while towing the towed vehicle. The dimension determination algorithm may be integral with the tow vehicle, or may be remotely located from the tow vehicle, and be integral with a portable hand held device, such as a smart phone, tablet, etc. The dimension determination algorithm automates the measurement and determination of the dimensions of the towed vehicle, and provides an easy way to provide the vehicle tow controller with the dimensions of the towed vehicle required for the vehicle tow controller to properly control the tow vehicle.

The above features and advantages and other features and advantages of the present teachings are readily apparent from the following detailed description of the best modes for carrying out the teachings when taken in connection with the accompanying drawings.

DETAILED DESCRIPTION

Those having ordinary skill in the art will recognize that terms such as "above," "below," "upward," "downward," "top," "bottom," etc., are used descriptively for the figures, and do not represent limitations on the scope of the disclosure, as defined by the appended claims. Furthermore, the teachings may be described herein in terms of functional and/or logical block components and/or various processing steps. It should be realized that such block components may be comprised of any number of hardware, software, and/or firmware components configured to perform the specified functions.

Figure 1:
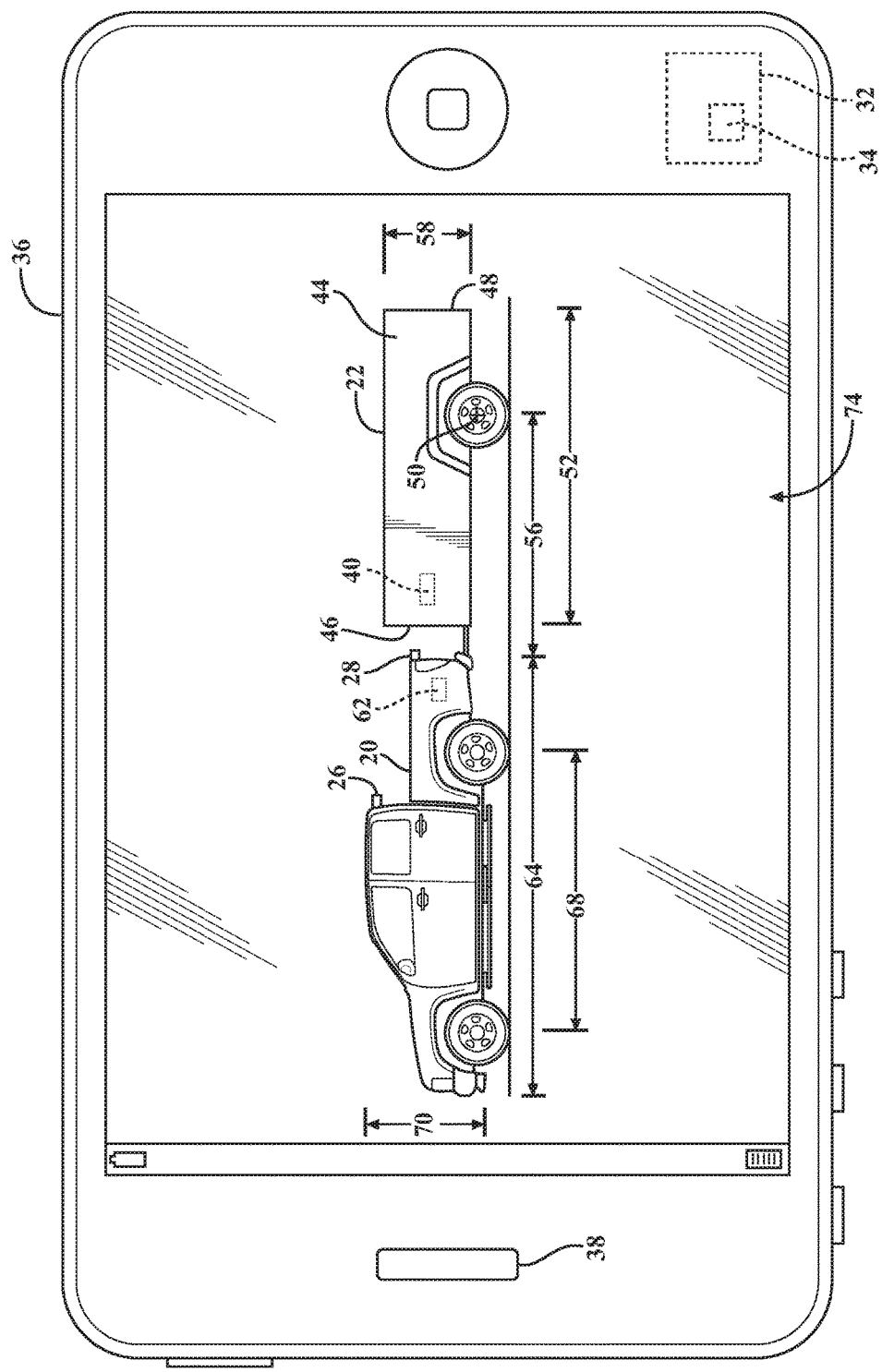
FIG. 1 is a schematic plan view of a portable device showing an image of a tow vehicle hitched to a towed vehicle.
Figure 2:
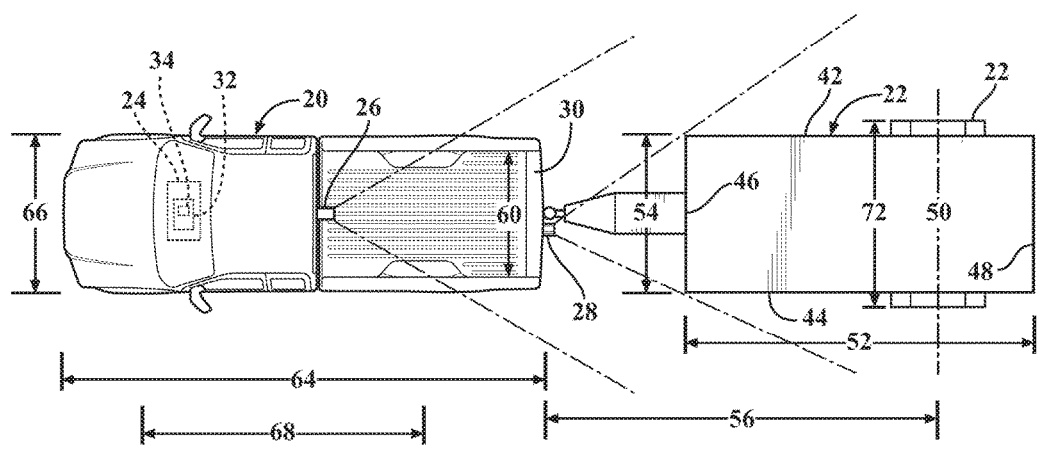
FIG. 2 is a schematic plan view of the tow vehicle hitched to the towed vehicle, showing cameras on the tow vehicle sensing images of the tow vehicle and the towed vehicle.
Figure 3:
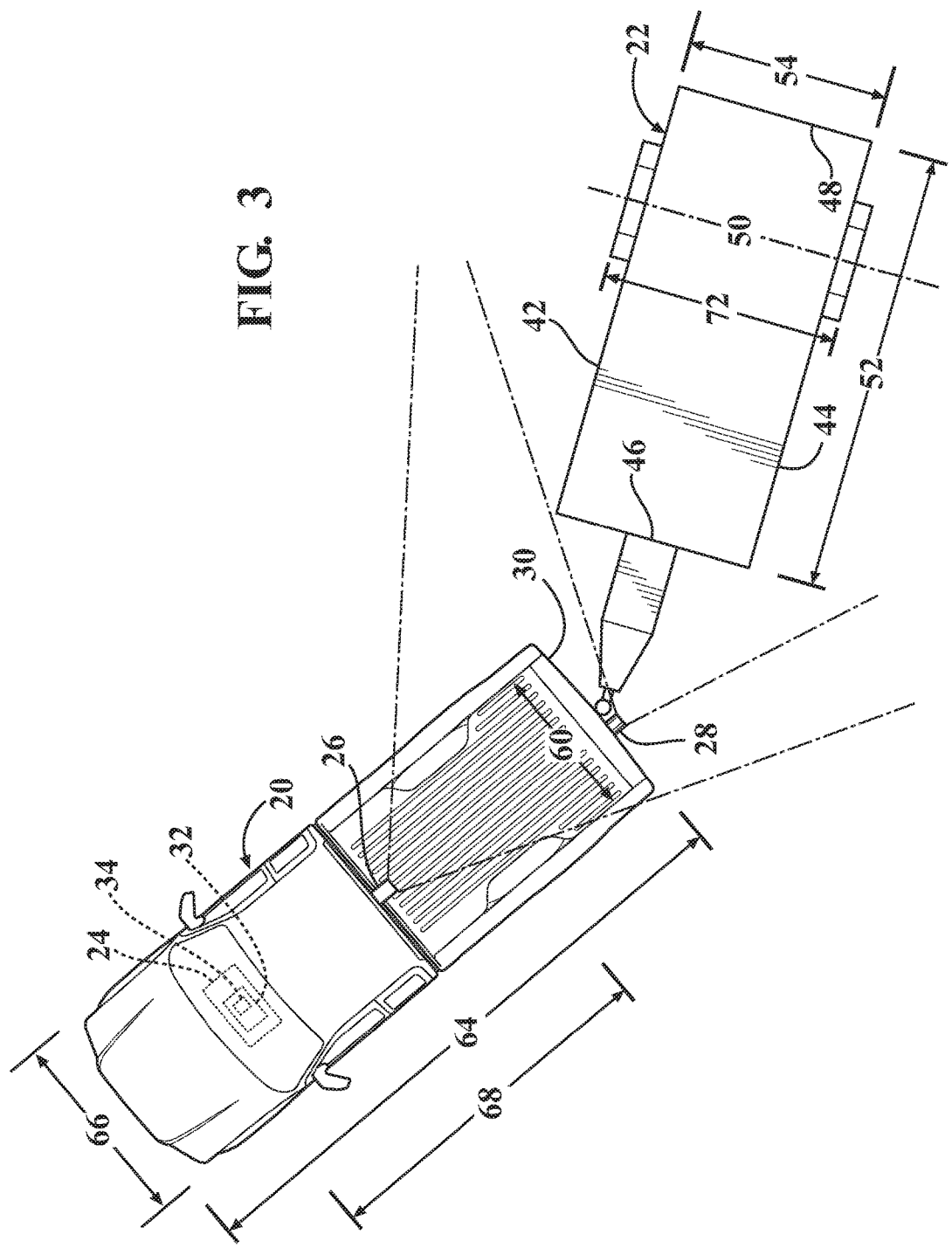
FIG. 3 is a schematic plan view of the tow vehicle hitched to the towed vehicle while executing a turn.

Referring to the Figures, wherein like numerals indicate like parts throughout the several views, a tow vehicle is generally shown at 20, and a towed vehicle is generally shown at 22. Referring to FIGS. 1 through 3, the tow vehicle 20 may include any motorized vehicle capable of pulling the towed vehicle 22. For example, the tow vehicle 20 may include, but is not limited to, a car, a truck, a van, a tractor, an ATV, an RV, etc., the towed vehicle 22 may include any vehicle that is attached or hitched to the tow vehicle 20 in a manner that allows the tow vehicle 20 to pull the towed vehicle 22. For example, the towed vehicle 22 may include, but is not limited to, a trailer (of any size and/or configuration), a car, a truck, etc. The towed vehicle 22 is attached to the tow vehicle 20 via a hitch system, such as but not limited to a ball and cup hitch system, a pintle hitch system, a gooseneck hitch system, or a fifth wheel hitch system. The manner and equipment used to connect the towed vehicle 22 to the tow vehicle 20 is well known in the art, and is therefore not described in detail herein.

As shown in FIGS. 2 and 3, the tow vehicle 20 may include a vehicle tow controller 24 that is integral with the tow vehicle 20. The vehicle tow controller 24 may be used to control the operation of the tow vehicle 20 to assist or completely execute various operating maneuvers associated with handling the towed vehicle 22. The vehicle tow controller 24 may include a computer and/or processor, and include all software, hardware, memory, algorithms, connections, sensors, etc., necessary to manage and control the operation of the tow vehicle 20. It should be appreciated that the vehicle tow controller 24 may include any device capable of analyzing data from various sensors, comparing data, making the necessary decisions required to control the operation of the tow vehicle 20 and executing the required tasks necessary to control the operation of the tow vehicle 20.

The vehicle tow controller 24 may be embodied as one or multiple digital computers or host machines, integrated into the tow vehicle 20, each having one or more processors, read only memory (ROM), random access memory (RAM), electrically-programmable read only memory (EPROM), optical drives, magnetic drives, etc., a high-speed clock, analog-to-digital (A/D) circuitry, digital-to-analog (D/A) circuitry, and any required input/output (I/O) circuitry, I/O devices, and communication interfaces, as well as signal conditioning and buffer electronics.

The computer-readable memory may include any non-transitory/tangible medium which participates in providing data or computer-readable instructions. Memory may be non-volatile or volatile. Non-volatile media may include, for example, optical or magnetic disks and other persistent memory. Example volatile media may include dynamic random access memory (DRAM), which may constitute a main memory. Other examples of embodiments for memory include a floppy, flexible disk, or hard disk, magnetic tape or other magnetic medium, a CD-ROM, DVD, and/or any other optical medium, as well as other possible memory devices such as flash memory.

The vehicle tow controller 24 includes tangible, non-transitory memory on which are recorded computer-executable instructions, including various control algorithms, and optionally including a dimension determination algorithm 34 described in greater detail below. The processor of the vehicle tow controller 24 is configured for executing the various control algorithms, and optionally for executing the dimension determination algorithm 34.

The tow vehicle 20 may further be equipped with one or more image sensing devices. Each of the image sensing devices may include, but are not limited to, a digital camera, a digital video camera, or some other similar image sensing device suitable for use on a motorized vehicle. As shown in FIGS. 2 and 3, the tow vehicle 20 is depicted as a pick-up truck having a first image sensing device 26 mounted near an upper rear surface of the roof line, and a second image sensing device 28 mounted near an upper rear surface of a tailgate 30 of the truck. It should be appreciated that different vehicle configurations may include different numbers of image sensing devices, located at different locations on the tow vehicle 20.

A method of determining a dimension of the towed vehicle 22 is described herein. The dimension of the towed vehicle 22 may include, but is not limited to, an overall length 52 of the towed vehicle 22, a width 54 of the towed vehicle 22, a tire tracking width 72 of the towed vehicle 22, a distance 56 between a hitch and one or more axis of rotation 50 of the wheels of the towed vehicle 22, etc. The method is implemented by a controller 32, using the dimension determination algorithm 34 noted above. The controller 32 may be integral with the tow vehicle 20, or may be located remotely from the tow vehicle 20. If the controller 32 is integral with the tow vehicle 20, the controller 32 may include the vehicle tow controller 24 and/or may be separate from the vehicle tow controller 24 and linked to the vehicle tow controller 24 via the vehicle communication systems. If the controller 32 is integral with the tow vehicle 20, then a dimension determination algorithm 34 may utilize the image sensing devices of the vehicle, such as the first image sensing device 26 and the second image sensing device 28 shown in the exemplary embodiment in the Figures. If the controller 32 is remote from the vehicle, then the controller 32 may be integral with a portable, hand held device 36, such as a smart phone, tablet, laptop computer, etc. Most portable, hand held devices 36 include an image sensing device 38, which may be used by the dimension determination algorithm 34. It should be appreciated that if the controller 32 is remote from the vehicle, the controller 32, whether part of the portable hand held device 36 or not, includes a processor, and all software, hardware, memory, algorithms, connections, sensors, etc., necessary to execute the dimension determination algorithm 34. Accordingly, it should be appreciated that the term "controller 32" as used to describe the method of determining a dimension of the towed vehicle 22, may include any computing device capable of performing the required tasks, such as but not limited to the vehicle tow controller 24, the portable hand held device 36, or some other computing device.

Figure 4:
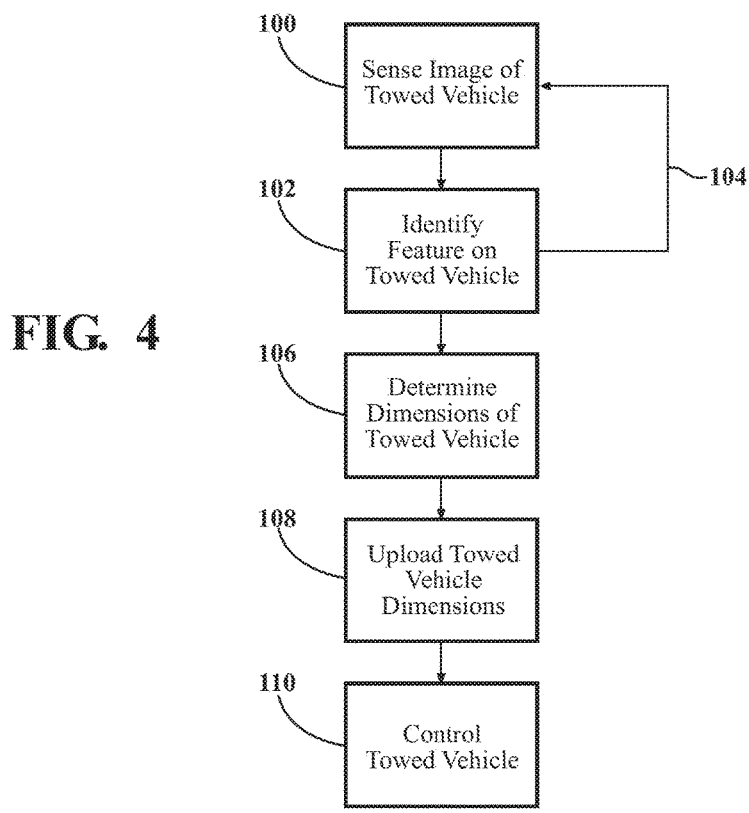
FIG. 4 is a flow chart representing a method of calculating a dimension of the towed vehicle.

As described above, the dimension determination algorithm 34 is operable on the controller 32, e.g., the vehicle tow controller 24 or the portable hand held device 36, for calculating at least one dimension of the towed vehicle 22. Referring to FIG. 4, the method includes sensing an image of the towed vehicle 22 with an image sensing device. The step of sensing the image of the towed vehicle 22 is generally indicated by box 100 in FIG. 4. FIG. 1 shows an image 74 of the towed vehicle 22 hitched to the tow vehicle 20, on a screen of the portable hand held device 36. As noted above, the image sensing device may include one or more image sensing devices on the tow vehicle 20 (e.g., the first image sensing device 26 and/or the second image sensing device 28), or may include the image sensing device 38 on the portable hand held device 36. The sensed image may include a still image, i.e., a single frame, or may alternatively include a video, including several consecutive frames. Once the image sensing device has captured the sensed image of the towed vehicle 22, the sensed image is communicated to the controller 32, so that the controller 32, using the dimension determination algorithm 34, may examine and process the sensed image as described in detail below. The sensed image may be communicated to the controller 32, and saved in the memory of the controller 32, in any manner known to those skilled in the art, and suitable for the specific type and/or configuration of the controller 32.

The image of the towed vehicle 22 may include at least one feature or target that the dimension determination algorithm 34 may recognize. The dimension determination algorithm 34 may use spatial or shape recognition software to identify the features or targets of the towed vehicle 22. The step of identifying a feature or target on the towed vehicle 22 is generally indicated by box 102 in FIG. 4. If the dimension determination algorithm 34 is unable to identify a feature or target on the towed vehicle 22 in the sensed image, generally indicated at 104, then the dimension determination algorithm 34 may sense or capture another image of the towed vehicle 22, and start the process again. The features of the towed vehicle 22 may then be used to determine the dimensions of the towed vehicle 22. Referring to FIGS. 1 through 3, the features may include, but are not limited to: indicia 40 on the towed vehicle 22, a first side 42 of the towed vehicle 22, a second side 44 of the towed vehicle 22, a forward end 46 of the towed vehicle 22, a rearward end 48 of the towed vehicle 22, or a center of rotation 50 of a wheel on the towed vehicle 22. The features of the towed vehicle 22 may be used to determine the dimensions of the towed vehicle 22, such as by determining a distance between respective features. For example, a length 52 of the towed vehicle 22 may be obtained by determining the distance between the forward end 46 and the rearward end 48 of the towed vehicle 22.

Once the dimension determination algorithm 34 has identified one or more features of the towed vehicle 22, the dimension determination algorithm 34 then determines the dimensions of the towed vehicle 22. The step of determining the dimensions of the towed vehicle 22 is generally indicated by box 106 in FIG. 4. The dimensions of the towed vehicle 22 may be determined in any suitable manner, by any suitable technique. For example, if the feature that is identified includes indicia 40 on the towed vehicle 22, the dimension determination algorithm 34 may use spatial or shape recognition software to recognize the indicia 40 in order to identify the towed vehicle 22. As used herein, the term "shape recognition software" should be interpreted broadly to include any software program that is capable of recognizing shapes and/or patterns, objects, etc., from one or more images. Shape recognition software is well known in the art, and is therefore not described in detail herein. For example, the indicia 40 may include a symbol or text that represents a make and model of the towed vehicle 22. The dimension determination algorithm 34 may then use the make and model of the towed vehicle 22 to reference data files, possibly stored in the memory of the controller 32, or alternatively accessed through the internet, to determine the dimensions of the towed vehicle 22. For example, if the indicia 40 indicates a specific make and model of a trailer, and the dimensions of that specific make and model of trailer are stored in the memory the controller 32, or otherwise ascertainable, then the dimension determination algorithm 34 may reference the data files that include the dimensions for that specific make and model of trailer in order to obtain and/or determine the dimensions of the towed vehicle 22. The dimensions of the towed vehicle 22 may include, but are not limited to, an overall length 52 of the towed vehicle 22, an overall width 54 of the towed vehicle 22, a distance 56 between a hitch and each of the axles/wheels of the towed vehicle 22, a height 58 of the towed vehicle 22, etc.

It should be appreciated that the dimension of the towed vehicle 22 may be determined in other manners as well. For example, it should be appreciated that if the sensed image includes an object having known dimensions, then the known dimensions of the object in the sensed image may be used by the dimension determination algorithm 34 to provide a scale to the sensed image. Once the scale of the sensed image is known, then the dimension determination algorithm 34 may measure the dimensions of the towed vehicle 22 from the sensed image, using the known scale of the sensed image.

One possible manner in which the dimension determination algorithm 34 may determine the scale of the sensed image, is by determining a known size of an object in the sensed image. For example, the tow vehicle 20 may be used to determine the scale of the sensed image. If the tow vehicle 20 is used to determine the scale of the sensed image, then it should be appreciated that the sensed image must include the towed vehicle 22 hitched to the tow vehicle 20, such that at least a portion of the tow vehicle 20 and a portion of the towed vehicle 22 are simultaneously captured in the sensed image, such as shown in FIG. 1.

If the tow vehicle 20 is used to determine the scale of the sensed image, then one or more dimensions of the tow vehicle 20 must be known. For example, if the image sensing device includes the first image sensing device 26 shown in the Figures, and if the first image sensing device 26 is positioned to capture a width 60 of the tailgate 30, then the width 60 of the tailgate 30 may be used as the known dimension of the tow vehicle 20. Using this method, the controller 32 would be programmed to include the known width 60 of the tailgate 30. The dimension determination algorithm 34 could then use spacial and/or shape recognition software to identify the tailgate 30 in the sensed image, and correlate the size of the tailgate 30 in the sensed image to the known size of the tailgate 30 saved in the memory of the controller 32. In so doing, the scale of the sensed image may be determined. Once the dimension determination algorithm 34 has determined the scale of the sensed image, it may then determine dimensions of the towed vehicle 22. For example, the dimension determination algorithm 34 may use shape and/or special recognition software to identify the features of the towed vehicle 22, such as the first side 42 and the second side 44 of the towed vehicle 22, and may calculated the distance and/or dimension between the first side 42 and the second side 44 of the towed vehicle 22, i.e., the width 54 of the towed vehicle 22. It should be appreciated that in order to determine a length 52 of the towed vehicle 22 and/or a distance 56 between a hitch of the towed vehicle 22 and one or more wheels of the towed vehicle 22, the appropriate features must be identifiable in the sensed image. Accordingly, it should be appreciated that in order to determine some dimensions of the towed vehicle 22, the sensed image may need to be captured while the tow vehicle 20 and the towing vehicle are angled relative to each other, such as may occur while executing a turn, which is shown in FIG. 3.

In an alternative embodiment, the sensed image 74 of the towed vehicle may include a shadow cast from the towed vehicle 22. The dimension determination algorithm 34 may determine at least one dimension of the towed vehicle 22 based on the shadow cast from the towed vehicle 22. For example, the dimension determination algorithm 43 may determine the sun's position based on current GPS coordinates of the vehicle and the current time and date. Using the sun's current position, the dimension determination algorithm 34 may calculate the length 52 of the towed vehicle 22, from the shadow cast from the towed vehicle 22, without the tow vehicle 20 and the towed vehicle 22 being angled relative to each other. In other words, once the dimension determination algorithm 34 has determined the scale of the sensed image, it may then determine dimensions of the towed vehicle 22 using the shadow of the towed vehicle 22 and the current position of the sun.

A similar process that uses the tow vehicle 20 to determine the scale of the sensed image, may include identifying the make and model of the tow vehicle 20, and then obtaining known dimensions of the tow vehicle 20 based on the make and model of the tow vehicle 20. The tow vehicle 20 may be identified in any suitable manner. For example, the make and model of the tow vehicle 20 may be a data input into the dimension determination algorithm 34. In such a case, a user would be required to input the appropriate make and model of the tow vehicle 20. Alternatively, the dimension determination algorithm 34 may identify the tow vehicle 20 from the sensed image. For example, the dimension determination algorithm 34 may use spatial and/or shape recognition software that recognizes the shape of the tow vehicle 20 or indicia 62 on the tow vehicle 20. For example, the dimension determination algorithm 34 may be programmed to recognize manufacturer emblems and/or model badges in order to identify the make and model of the tow vehicle 20. Alternatively, the dimension determination algorithm 34 may use shape recognition software to recognize a shape of the tow vehicle 20, such as a side profile of the tow vehicle 20 shown in FIG. 1. The dimension determination algorithm 34 may then compare the identified profile of the tow vehicle 20 in the sensed image to a library of profiles of different vehicles to identify the specific make and model of the tow vehicle 20.

The dimension determination algorithm 34 may then use the make and model of the tow vehicle 20 to reference data files, possible stored in the memory of the controller 32, or alternatively accessed through the internet, to determine the dimensions of the tow vehicle 20. For example, if the indicia 62 indicates a specific make and model of the tow vehicle 20, and the dimensions of that specific make and model of the tow vehicle 20 are stored in the memory the controller 32, or otherwise ascertainable, then the dimension determination algorithm 34 may reference those data files that include the dimensions for that specific make and model of tow vehicle 20 in order to obtain and/or determine the dimensions of the tow vehicle 20. The dimensions of the tow vehicle 20 may include, but are not limited to, an overall length 64 of the tow vehicle 20, an overall width 66 of the tow vehicle 20, a wheelbase 68 of the tow vehicle 20, a height 58 of the tow vehicle 20, etc.

The dimension determination algorithm 34 could then use special and or shape recognition software to identify the appropriate feature of the tow vehicle 20, in the sensed image, that correlates to the dimension of the tow vehicle 20 that was determined. For example, referring to FIG. 1, the dimension determination algorithm 34 may obtain the known dimension for the overall length 64 of the tow vehicle 20, and then identify the overall length 64 of the tow vehicle 20 in the sensed image. The dimension determination algorithm 34 may then correlate the size of the feature of the tow vehicle 20 in the sensed image to the known size of the feature of the tow vehicle 20. In so doing, the scale of the sensed image may be determined. Once the dimension determination algorithm 34 has determined the scale of the sensed image, it may then determine dimensions of the towed vehicle 22. For example, the dimension determination algorithm 34 may use spatial and/or shape recognition software to identify the features of the towed vehicle 22, such as the forward end 46 and the rearward end 48 of the towed vehicle 22, and may calculated the length 52 between the forward end 46 and the rearward end 48 of the towed vehicle 22, i.e., the length 52 of the towed vehicle 22.

In addition to the process described above, the dimension determination algorithm 34 may use, either in combination with the processes described above or independent of the processes described above, stereo disparity or structure from motion techniques to determine the dimensions of the tow vehicle 20. As is known to those skilled in the art, stereo disparity uses the difference between two stereo images, taken side by side, to calculate a distance to a specific feature. As is known to those skilled in the art, structure from motion is the process of estimating three dimension structures from two-dimension image sequences (e.g., consecutive frames from a video). The stereo disparity and structure from motion techniques of calculating distance to and/or sizes of objects are well known and are therefore not described in detail herein.

Once the dimension determination algorithm 34 has determined the dimensions of the towed vehicle 22, then the dimensions of the towed vehicle 22 may be uploaded into the vehicle tow controller 24 of the tow vehicle 20. The step of uploading the dimensions of the towed vehicle 22 onto the vehicle tow controller 24 is generally indicated by box 108 in FIG. 4. The dimensions of the towed vehicle 22 may be uploaded into the vehicle tow controller 24 in any suitable manner. For example, existing communications protocols may allow the dimension determination algorithm 34 to automatically communicate and/or upload the dimensions to the vehicle tow controller 24. Alternatively, the user may manually input the dimensions of the towed vehicle 22 into the vehicle tow controller 24.

The vehicle tow controller 24 may then control the tow vehicle 20 based on the dimensions of the towed vehicle 22. The step of controlling the towed vehicle 22 is generally indicated by box 110 in FIG. 4. Control of the tow vehicle 20 may include, but is not limited to, changing a current operating state of one of a steering system of the tow vehicle 20, a throttle of the tow vehicle 20, or a braking system of the tow vehicle 20. The type of control will depend upon that function that the vehicle tow controller 24 is attempting to execute. The process in which the vehicle tow controller 24 controls the operation of the tow vehicle 20 is known to those skilled in the art, and is therefore not described in detail herein.

The detailed description and the drawings or figures are supportive and descriptive of the disclosure, but the scope of the disclosure is defined solely by the claims. While some of the best modes and other embodiments for carrying out the claimed teachings have been described in detail, various alternative designs and embodiments exist for practicing the disclosure defined in the appended claims.

The invention claimed is:

1. A method of calculating at least one dimension of a towed vehicle, the method comprising:
sensing an image with an image sensing device, wherein sensing the image includes sensing the image of a tow vehicle and the towed vehicle hitched together, such that at least a portion of the tow vehicle and a portion of the towed vehicle are simultaneously captured in the sensed image;
identifying a feature of the tow vehicle in the sensed image, wherein the feature of the tow vehicle includes a known dimension that is saved in a memory of a controller of the tow vehicle;
identifying a feature on the towed vehicle in the sensed image with the controller using a dimension determination algorithm; and
determining the at least one dimension of the towed vehicle with the controller using the dimension determination algorithm by using the known dimension of the feature of the tow vehicle identified in the sensed image to calculate the at least one dimension of the feature the on the towed vehicle identified in the sensed image.

2. The method set forth in claim 1 wherein the image sensing device is remote from the tow vehicle.

3. The method set forth in claim 2 wherein the image sensing device is integral with a portable hand held device.

4. The method set forth in claim 1 wherein identifying the feature on the towed vehicle in the sensed image includes identifying one of indicia on the towed vehicle, a first side of the towed vehicle, a second side of the towed vehicle, a forward end of the towed vehicle, a rearward end of the towed vehicle, or a center of rotation of a wheel on the towed vehicle.

5. The method set forth in claim 1 wherein identifying the feature of the tow vehicle in the sensed image includes identifying a make and model of the tow vehicle from the sensed image with the controller using the dimension determination algorithm.

6. The method set forth in claim 5 further comprising correlating a shape of the tow vehicle in the sensed image to the make and model of the tow vehicle with the controller using the dimension determination algorithm.

7. The method set forth in claim 3 further comprising wirelessly communicating the sensed image from the portable hand held device to the controller of the tow vehicle, and storing the sensed image in the memory of the controller.

8. A method of controlling a tow vehicle having a towed vehicle connected thereto, the method comprising:
sensing an image with an image sensing device of a portable hand held device, wherein the sensed image is a side view image including both the tow vehicle and the towed vehicle connected thereto;
wirelessly communicating the sensed image from the portable hand held device to a controller of the tow vehicle;
storing the sensed image in a memory of the controller;
determining at least one dimension of the towed vehicle with the controller of the tow vehicle using a dimension determination algorithm operable on the controller;
wherein the dimension determination algorithm is operable to:
identify a make and model of the tow vehicle from the sensed image, wherein the make and model of the tow vehicle includes a feature of the tow vehicle having a known dimension saved in the memory of the controller; and
determine the at least one dimension of the towed vehicle by using the known dimension of the feature of the tow vehicle to calculate the at least one dimension of a feature on the towed vehicle identified in the sensed image; and
controlling the tow vehicle with the controller of the tow vehicle based on the at least one dimension of the towed vehicle.

9. The method set forth in claim 8 further comprising identifying the feature on the towed vehicle in the sensed image, wherein the identified feature includes one of indicia on the towed vehicle, a first side of the towed vehicle, a second side of the towed vehicle, a forward end of the towed vehicle, a rearward end of the towed vehicle, or a center of rotation of a wheel on the towed vehicle.

10. The method set forth in claim 1, wherein sensing the image with the image sensing device is further defined as sensing the image with a portable hand held device to capture a side view of the tow vehicle and the towed vehicle, such that a side profile of the tow vehicle and a side profile of the towed vehicle are shown in the sensed image.

11. The method set forth in claim 1, wherein sensing the image with the image sensing device includes sensing multiple images including the tow vehicle and the towed vehicle.

12. The method set forth in claim 11, wherein determining the at least one dimension of the feature on the towed vehicle includes determining the at least one dimension of the feature on the towed vehicle using a stereo disparity ranging process with the multiple images of the tow vehicle and the tow vehicle.

13. The method set forth in claim 8, wherein sensing the image with the image sensing device includes sensing multiple images including the tow vehicle and the towed vehicle.

14. The method set forth in claim 13, wherein the dimension determination algorithm is operable to determine the at least one dimension of the feature on the towed vehicle using a stereo disparity ranging process with the multiple images of the tow vehicle and the towed vehicle.

* * * * *